Figure 1:
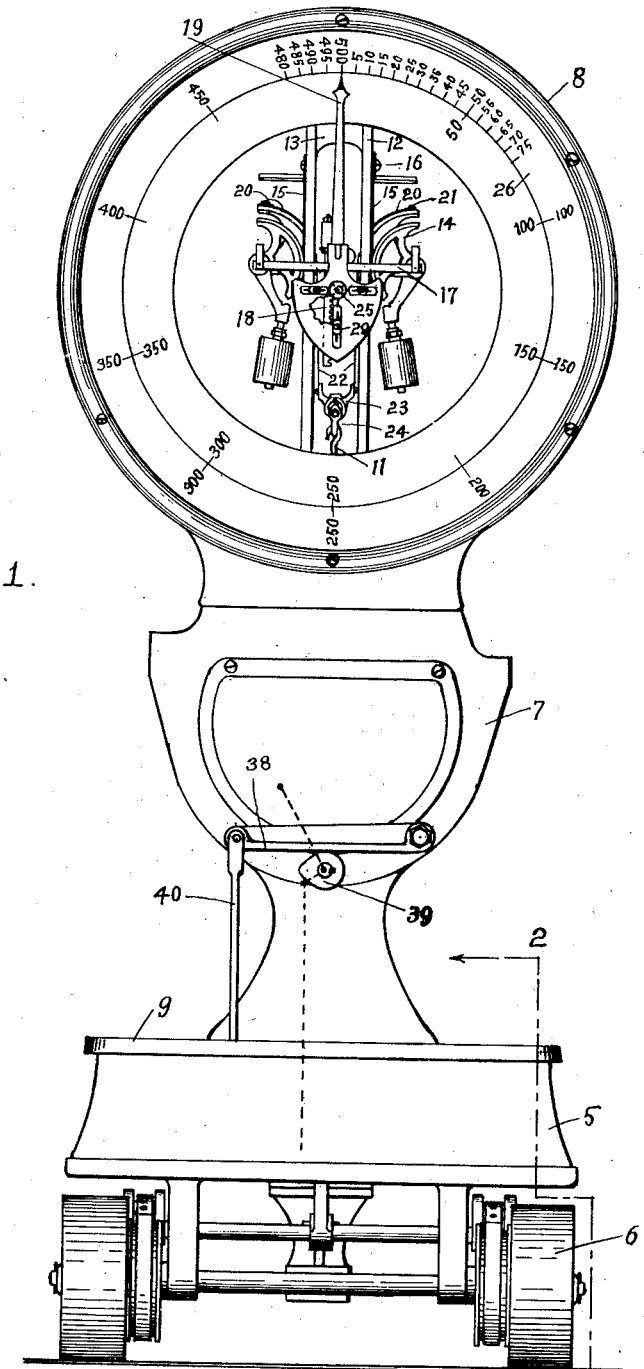

O. C. REEVES.
WEIGHING SCALE.
APPLICATION FILED AUG. 14, 1916.

1,278,748.

Patented Sept. 10, 1918.
2 SHEETS—SHEET 1.

INVENTOR.
Orwell C. Reeves
by George R. Frye
Attorney

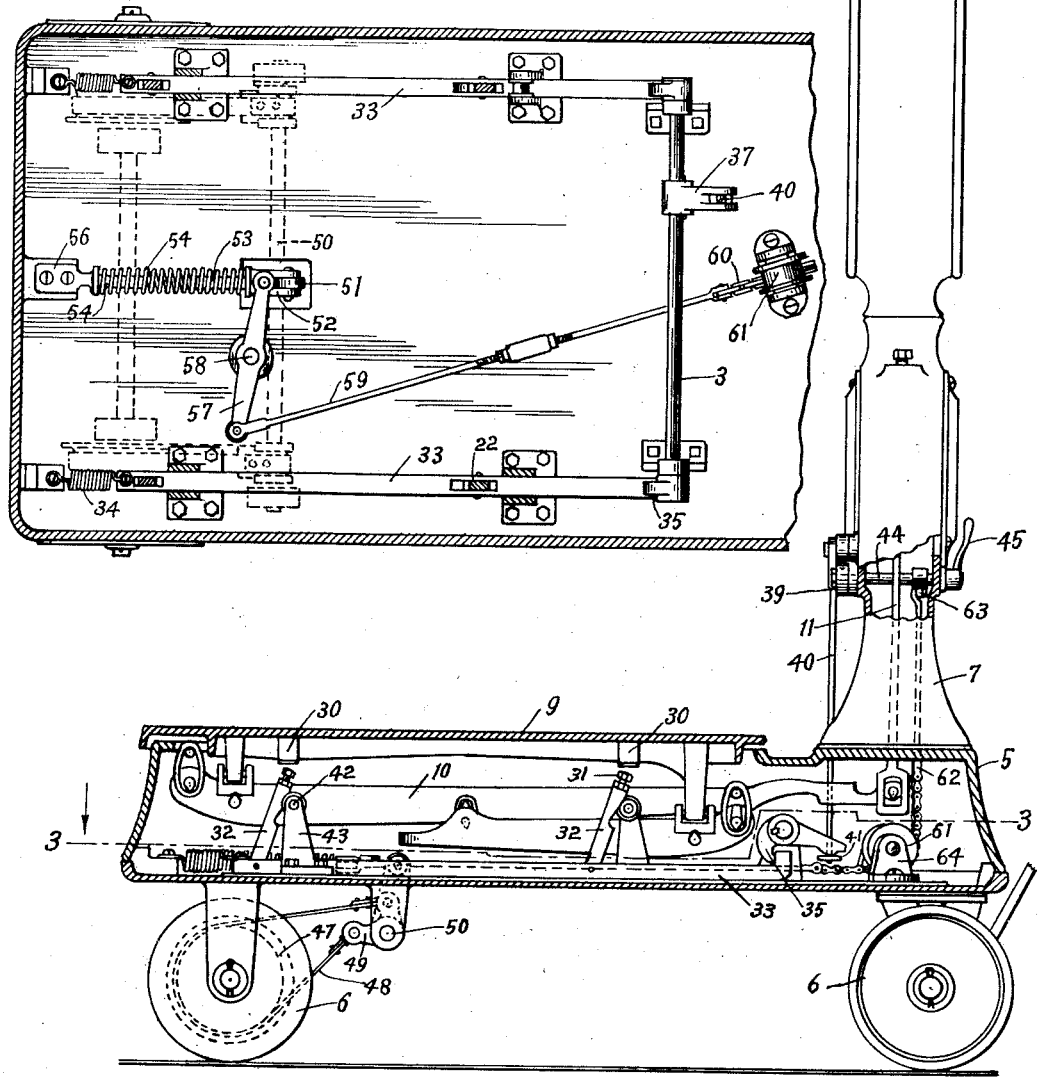

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING-SCALE.

1,278,748.  Specification of Letters Patent.  Patented Sept. 10, 1918.

Application filed August 14, 1916. Serial No. 114,913.

*To all whom it may concern:*

Be it known that I, ORWELL C. REEVES, a citizen of the United States, residing at Toledo, in the county of Lucas and State of Ohio, have invented certain new and useful Improvements in Weighing-Scales, of which the following is a specification.

This invention relates particularly to that class of weighing scales wherein the platform is mounted upon a portable base which is provided with wheels or casters for moving the scales from place to place as desired.

Among the objects of my invention are the provision of improved mechanism whereby the bearings and other delicate parts of the scale are protected against injury from jarring or rough handling of the truck during transportation, the prevention of accidental movement of the portable base during the weighing operations of the scale, and the adaptation of a scale so protected with a pendulum weighing mechanism.

Other objects and advantages of my invention will readily appear from the following description, wherein a preferred embodiment of my invention is illustrated in the accompanying drawings and particularly pointed out in the subjoined claims.

In the drawings:—

Figure 1 is a front elevation of my improved scale; Fig. 2 is a side elevation thereof, wth parts shown in section, substantially on the line 2—2 of Fig. 1; and Fig. 3 is a horizontal sectional view through the base taken substantially on the line 3—3 of Fig. 2.

In the illustrated embodiment of the invention, the base 5 of the scale is mounted upon wheels 6 and carries adjacent its forward end a hollow column or standard 7 supporting at its upper end the casing 8 adapted to inclose the weight-indicating and load-offsetting mechanism. The platform 9 is suitably supported upon a leverage system inclosed within the base 5, and the nose of the main lever 10 engages the steelyard rod 11 through which connection is made with the load-offsetting mechanism, if desired through an intermediate lever (not shown) mounted within the upper portion of the column 7.

It is to be understood that any suitable platform or platform lever mechanism may be employed in connection with the weighing mechanism of the scale, and that the load-offsetting mechanism may likewise be of any desired type, the weighing mechanism herein shown being illustrated and described only by way of example.

The load-offsetting mechanism of the embodiment herein illustrated comprises a rectangular frame having four vertical pillars 12 suitably supported from the wall of the housing 8 and secured together at top and bottom by means of cross pieces 13. The pillars 12, as herein shown, form tracks or bearings for rocker segments 14 (Fig. 1) which have rolling contact thereon, being supported in position by flexible ribbons 15 of steel or other desired material fastened at their lower ends to the segments and at their upper ends to the pillars, as at 16, being thus interposed between the pillars and segments at every position of the latter. The segments 14 are suitably secured in a vertically-movable frame 17 which serves to connect the several segments with each other, and through the medium of the vertically-disposed rack 18 connection is made with the indicator hand 19 of the indicating mechanism. Arranged between each pair of supporting segments 14 are larger segments 20, which are also suitably mounted in the vertically-movable frame 17 and extend at their periphery between the pillars 12 at the opposite sides of the rectangular frame, being connected at their upper ends, as at 21, to metallic ribbons 22 which pass over the arcuate faces of the segments and are attached at their lower ends to an equalizer bar 23, as clearly shown in Fig. 1. The equalizer bar 23 is suitably connected, as by means of the U-shaped link 24, with the upper end of the steelyard rod 11, though, as hereinbefore stated, an intermediate lever may be mounted in the upper portion of the column 7 with which the steelyard rod may be directly connected, and from which a hook rod or supplemental steelyard rod may be extended for connection with the link 24 of the equalizer bar 23. An indicator shaft 25 is mounted concentrically of the dial 26 and carries a pinion arranged to mesh with the vertically-disposed rack 18 which, as before described, is connected with the vertically-movable frame 17. At its forward extremity the indicator shaft carries the index hand 19, which hand is preferably formed of sheet metal and adjacent its pivotal point is expanded into a plate which is appropriately slotted, as at 27, to receive small adjustable weights for accurately counterbalancing the hand.

Before proceeding farther, it may be stated that the hereinbefore described mechanism constitutes the weighing mechanism of the scale, the operation of which is substantially as follows: A commodity being placed upon the platform 9 when it is resting upon the bearings of the platform-supporting leverage system, the nose of the main lever 10 will be depressed and will draw downwardly the steelyard rod 11 to effect a pull upon the equalizer bar 23 of the load-offsetting mechanism, whereby the pendulums will be swung outwardly to a position counterbalancing the weight of the load of the commodity, the frame 17 being elevated during such swinging movement a distance sufficient to rotate the indicator hand 19 over the graduated dial 26 to a position indicating the weight of the commodity on the platform.

Means will now be described whereby the platform 9 may be lifted from engagement with the leverage system and held in its raised position during the use of the scale as a truck or transporting medium. The platform is provided with a plurality of downwardly-extending lugs 30 adapted to be contacted by the adjustable extremities 31 of a plurality of lifting levers 32 which are pivoted at their lower ends to longitudinally-movable actuating rods 33 having secured at their rear extremities contractile springs 34 adapted to normally maintain the actuating rods in retracted position. The forward extremities of the rods 33 are preferably provided with upwardly-extending lugs adapted to be engaged by the face of the actuating arms 35 fixed upon a cross shaft 36 mounted in brackets carried by the scale base. The shaft 36 also carries the slotted arm 37 through which connection is made with a normally horizontal lever 38 pivoted on the column 7 and adapted to rest upon the cam 39. The link 40 is pivotally connected at its upper extremity to the lever 38 and the lower extremity thereof passes through the slot in the arm 37 and carries a head or washer 41 adapted to contact with the lower face of said arm. The lifting levers 32 are normally inclined when the scale is in readiness for weighing operations, the extremities 31 being out of contact with the lugs 30 of the platform, and intermediate their ends said levers engage fulcrum members 42, substantially as shown in Fig. 2. The fulcrum members preferably comprise rollers rotatable on stub shafts mounted in upstanding brackets 43 carried by the base, and at the point of contact with said rollers the lifting levers are provided with an inclined wall, as by recessing the levers. Suitable means may be provided for adjusting the length of the lifting levers, such as providing bolts threaded into suitable apertures in the upper extremities of the lifting levers. The cam 39 is fixed upon the rear extremity of the rock shaft 44 which is rotatively mounted in bearings in the column 7, the forward extremity of said shaft carrying a suitable handle 45 adapted to be grasped by the operator when it is desired to move the platform away from or onto the platform-supporting leverage system. Thus, when it is desired to raise the platform from engagement with the leverage system, the handle 45 is swung from the position shown in Fig. 2 so as to rotate the shaft 44 to bring the apex of the cam 39 into engagement with the horizontal lever 38, thus elevating said lever and the link 40 to rotate the shaft 36 and through the arms 35 to impart a forward movement to the actuating rods 33. The movement of the rods 33 will move the lower extremities of the lifting levers 32 forwardly, and as forward movement of the upper extremities of the lifting levers is prevented by the fulcrum members 42, the result will be that the lifting levers will approach more closely to a vertical position, and during their movement toward such vertical position will impinge against the lugs 30 on the platform 9, further movement then serving to lift the platform out of contact with the bearings of the leverage system. Inasmuch as it is unnecessary for the levers 32 to reach vertical positions in lifting the platform, the levers will again fall of their own weight into the inclined positions shown in Fig. 2 when the rods 33 are returned to their original positions. The forward movement of the actuating rods 33 will, of course, have stretched the contractile springs 34. The scale may now be moved from place to place and subjected to jarring or shaking movements without injuring the bearings and other delicate parts of the scale, and also heavy commodities may be thrown or roughly placed upon the scale platform without jarring the weighing mechanism of the scale.

As hereinbefore stated, the scale base is mounted upon wheels such as 6—6 in the drawings, to facilitate moving the same when desired, and to prevent accidental shifting of the scale during the weighing operation, as, for example, when placing a heavy commodity upon it, I provide means for braking the wheels at all times when the platform 9 rests upon the bearings of the leverage system. In the embodiment herein illustrated, I provide the rear wheels with brake flanges 47 adapted to co-act with the brake bands 48, which pass around the peripheries of the brake flanges and are secured at their opposite extremities to the arms of bell-crank levers 49 fixed upon the rock shaft 50 mounted in suitable brackets depending from the base. The rock shaft 50 also carries the upstanding arm 51 to which is pivotally connected a link 52 having at its rear extremity a boss 53 for guiding a compression spring 54, a similar boss 55 extending from a bracket 56 fixed to the scale base serving to position the opposite extremity of said spring. A horizontally-disposed lever 57 is pivoted intermediate its ends, as at 58, upon the scale base, and is connected at one extremity with the link 52 and at its other extremity with the adjustable link 59 which is connected with a flexible chain or cable 60 passing under the guide pulley 61 and connecting with the lower end of the vertically-disposed link 62, the upper end of which is pivotally secured to the arm 63 fixed on the rock shaft 44 (see Fig. 2). The guide pulley 61 is preferably mounted in the bracket 64 arranged at an angle to the sides of the base so as to permit a greater throw to the lever 57 upon the rotation of the shaft 44. The shaft 44, as hereinbefore described, carries the handle 45 and the cam 39 at its opposite extremities. Thus, when the handle 45 is turned from the position shown in Fig. 2 to actuate the mechanism for raising the platform 9 from its bearings on the leverage system, as hereinbefore described, the brake-throwing mechanism will simultaneously be actuated. As shown in Fig. 2, the brake is set so that the rear wheels 6 are prevented from rotating, since the platform 9 rests upon the leverage mechanism to permit the weighing of commodities upon the scale. When, however, the platform is raised from the bearings upon the rotation of the shaft 44, the arm 63 will be swung to impart an upward movement to the link 62, thereby moving the flexible chain 60 and the link 59 to rock the lever 57 on its pivots, thereby throwing the arm 51 rearwardly against the tension of the spring 54 and rotating the shaft 50 to rock the bell-crank levers 49 so as to loosen the brake bands 48 from the periphery of the brake flanges 47. The wheels 6 are now free to rotate and the scale may readily be moved to another location, the platform being held in elevated position during such movement. When the scale has reached the desired position and commodities are desired to be weighed, the handle 45 is rotated to the position shown in Fig. 2, thereby lowering the arm 63 and link 62 and allowing the pressure exerted by the spring 54 to throw the arm 51 and lever 57 to the position shown in Fig. 3, thereby rocking the shaft 50 and bell-crank lever 49 to draw the brake bands tightly against the peripheries of the brake flanges 47. Simultaneously, the rocking of the shaft 44 will swing the apex of the cam 39 out of engagement with the horizontal lever 38, allowing said lever and the link 40 to move downwardly and allow the contractile springs 34 to again draw the actuating rods 33 to the position shown in Fig. 3, the movement of said rods carrying the lower extremities of the lifting levers 32 rearwardly so that said levers are again brought into inclined position out of engagement with the lugs 30 of the platform, the platform meanwhile being lowered into engagement with the bearings of the leverage system.

It is to be understood that the brake mechanism may be applied to any or all of the wheels.

While it will be apparent that the illustrated embodiment of my invention herein disclosed is well calculated to adequately fulfil the objects primarily stated, it is to be understood that my invention is susceptible to modification, variation and change without departing from the spirit and scope of the invention as set forth in the subjoined claims.

Having described my invention, I claim:

1. In a scale and in combination with the load-offsetting mechanism thereof, a base having a plurality of wheels thereon, a platform adapted to engage a portion of the load-offsetting mechanism, braking means adapted to lock said wheels when the platform is in engagement with said mechanism, and means for simultaneously raising said platform from engagement with said mechanism and releasing said braking means.

2. In a scale and in combination with the load-offsetting mechanism thereof, a base having a plurality of wheels thereon, a platform adapted to engage a portion of the load-offsetting mechanism, braking means adapted to lock said wheels when the platform is in engagement with said mechanism including flanges on said wheels and brake bands encircling said flanges, and means for simultaneously raising said platform from engagement with said mechanism and releasing said braking means.

3. In a scale and in combination with the load-offsetting mechanism thereof, a base having a plurality of wheels thereon, a platform adapted to engage a portion of the load-offsetting mechanism, said platform having depending lugs thereon, braking means adapted to lock said wheels when the platform is in engagement with said mechanism, and means for engaging said lugs to raise the platform from engagement with said mechanism and simultaneously releasing said braking means.

4. In a weighing scale and in combination with the weighing mechanism thereof, means for relieving the load-offsetting mechanism from shock including a platform having lugs thereon, a plurality of normally inclined lifting levers adapted to contact therewith, actuating rods to which the lower extremities of the levers are pivoted, fulcrum members engaging the lifting levers intermediate their ends, and means for longitudinally moving the actuating rods to move the lifting levers toward a vertical position to bring them into contact with said lugs.

5. In a weighing scale and in combination with the weighing mechanism thereof, means for relieving the load-offsetting mechanism from shock including a platform having lugs thereon, a plurality of normally inclined lifting levers adapted to contact therewith, actuating rods to which the lower extremities of the levers are pivoted, fulcrum members engaging the lifting levers intermediate their ends, means for longitudinally moving the actuating rods to move the lifting levers toward a vertical position to bring them into contact with said lugs, and resilient means connected with the actuating rods and adapted to return said rods to normal position when said actuating means is released.

6. In a scale and in combination with the load-offsetting mechanism thereof, a platform adapted to engage a portion of the load-offsetting mechanism, means for raising the platform out of engagement with said mechanism including normally inclined lifting levers, the upper ends of which are normally spaced a short distance from the platform, fulcrum members engaging the lifting levers intermediate their ends, actuating rods to which the lower extremities of the lifting levers are pivoted, and means for moving the actuating rods to throw said lifting levers toward upright positions.

7. In a scale and in combination with the load-offsetting mechanism thereof, a platform adapted to engage a portion of the load-offsetting mechanism, means for raising the platform out of engagement with said mechanism including normally inclined lifting levers, the upper ends of which are normally spaced a short distance from the platform, fulcrum members engaging the lifting levers intermediate their ends, actuating rods to which the lower extremities of the lifting levers are pivoted, and means for moving the actuating rods to throw said lifting levers toward upright positions, said means including actuating arms contacting the actuating rods and a lever adapted to be elevated to rock the actuating arms.

8. In a scale and in combination with the load-offsetting mechanism thereof, a platform adapted to engage a portion of the load-offsetting mechanism, means for raising the platform out of engagement with said mechanism including normally inclined lifting levers, the upper ends of which are normally spaced a short distance from the platform, fulcrum members engaging the lifting levers intermediate their ends, actuating rods to which the lower extremities of the lifting levers are pivoted, and means for moving the actuating rods to throw said lifting levers toward upright positions, said means including actuating arms contacting the actuating rods, a lever adapted to be elevated to rock the actuating arms, and a cam engaging the last-mentioned lever.

9. In a scale and in combination with the load-offsetting mechanism thereof, a platform adapted to rest upon a portion of the load-offsetting mechanism and having lugs depending therefrom, means for elevating the platform out of engagement with said mechanism including lifting levers adapted to engage said lugs, means for elevating the upper extremities of the lifting levers, a plurality of wheels carried by the scale base having brake flanges thereon, brake bands adapted to encircle said flanges, bell-crank levers carrying the opposite ends of the brake bands, and means for rocking the bell-crank levers to release the brake bands from engagement with the flanges simultaneously with the elevation of the platform from engagement with said mechanism and for tightening the brake bands upon the brake flanges when the platform is lowered into engagement with the load-offsetting mechanism.

ORWELL C. REEVES.

Witnesses:
H. S. BERGEN,
FRANCES C. DOYLE.